No. 712,742.  
E. THOMSON.  
ALTERNATING CURRENT METER.  
(Application filed Apr. 10, 1901.)

Patented Nov. 4, 1902.

(No Model.)

2 Sheets—Sheet 1.

Witnesses.

Inventor:
Elihu Thomson
by Albert G. Davis
Atty

No. 712,742. Patented Nov. 4, 1902.
E. THOMSON.
ALTERNATING CURRENT METER.
(Application filed Apr. 10, 1901.)
(No Model.) 2 Sheets—Sheet 2.

Witnesses.

Inventor.
Elihu Thomson

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ALTERNATING-CURRENT METER.

SPECIFICATION forming part of Letters Patent No. 712,742, dated November 4, 1902.

Application filed April 10, 1901. Serial No. 55,155. (No model.)

*To all whom it may concern:*

Be it known that I, ELIHU THOMSON, a citizen of the United States, residing at Swampscott, county of Essex, State of Massachusetts, have invented certain new and useful Improvements in Alternating-Current Meters, (Case No. 1,507,) of which the following is a specification.

My invention relates to alternating-current induction-meters, and has for its object to produce a wattmeter of simple and compact construction embodying a novel and efficient means for generating a shifting field to actuate the short-circuited member or armature of the meter in such a manner as to produce a correct registration of the energy consumed in the circuit to which the meter is connected. The construction which I have devised combines in a single structure both the shunt and the series magnet systems.

Figure 1:
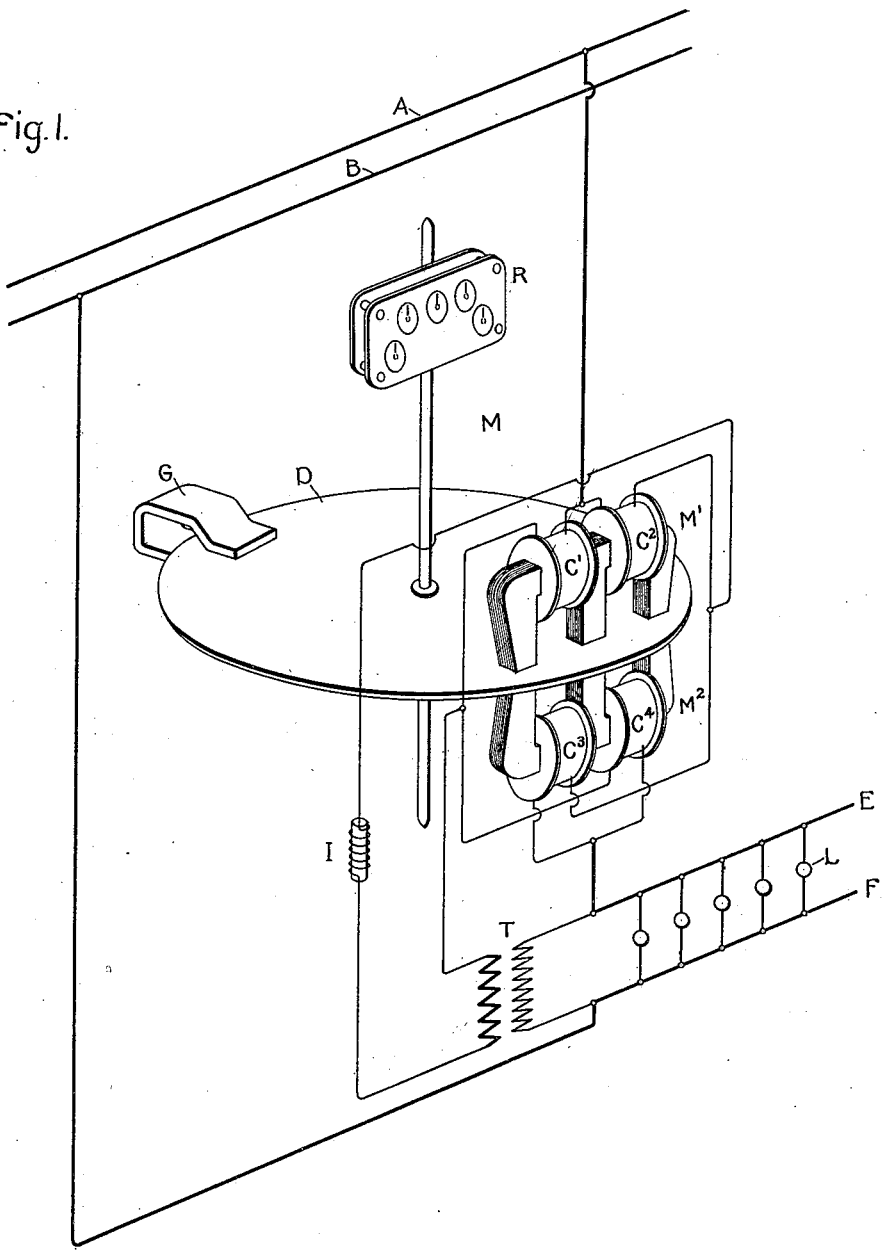
Figure 2:
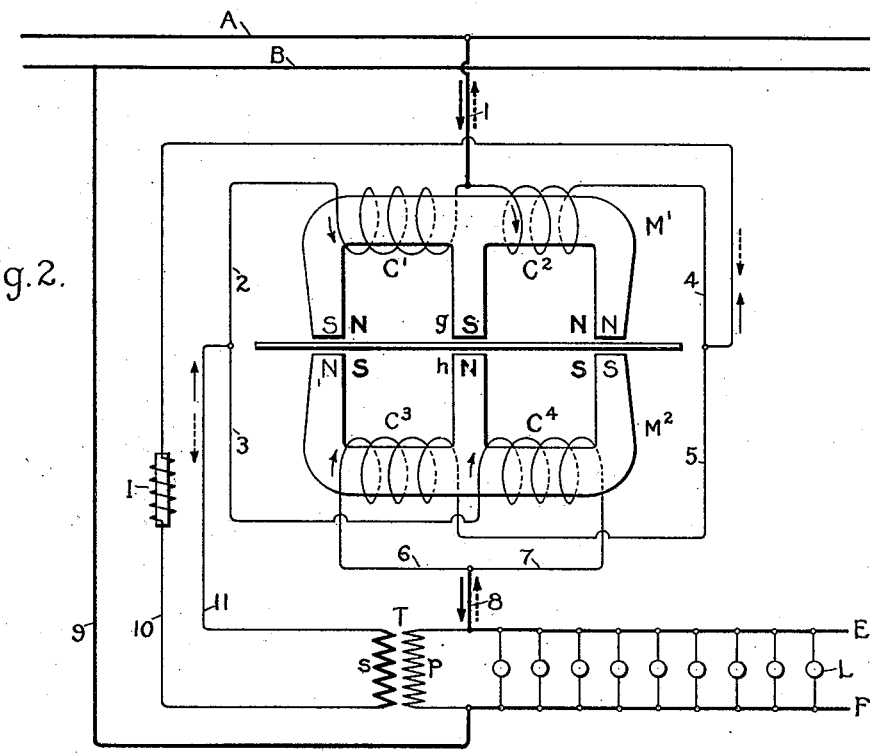

In the accompanying drawings, which illustrate an embodiment of my invention, Figure 1 shows the essential elements of a meter having its field-magnet system constructed according to my invention, the meter-winding being suitably connected to the source of supply and to the load. Fig. 2 is a diagram of the field-magnet system, showing the arrangement of the coils of a single winding which serves at the same time both as the series and the shunt winding of the meter. Figs. 3 to 6, inclusive, are diagrams illustrating the changes which take place in the magnetization of the field-magnet system during one complete cycle.

Referring first to Fig. 1, A B indicate the mains of an alternating-current-supply system. L indicates the translating devices to which current is to be supplied. Interposed between the supply-mains A B and mains E F, to which the translating devices constituting the load are connected, is the meter M. This meter, as shown, comprises a disk armature D, mounted on a shaft suitably geared to a registering mechanism R. A retarding-magnet G is mounted so that its poles include a portion of the disk.

The novel magnet system which constitutes the subject-matter of my present invention comprises two peculiar electromagnets $M'$ and $M^2$, suitably positioned with respect to the meter-disk at a point removed from the influence of the retarding-magnet. This field-magnet system serves to produce a rotation of the meter-disk proportional to the consumption of energy in the main circuit. The core of each of the separate magnets $M'$ and $M^2$ is preferably laminated and is provided with three polar projections, and the two magnets are mounted so that their corresponding polar projections face each other on opposite sides of the meter-disk. The magnets are provided with a single winding comprising the four coils $C'$, $C^2$, $C^3$, and $C^4$, connected in a closed circuit by the conductors 2 to 7, inclusive. This winding serves at the same time both as the shunt and the series winding of the meter, the connections of the shunt or potential circuit being made at the junction-points of the conductors 2 and 3 and 4 and 5, and the series circuit connections being made on the one side between the coils $C'$ and $C^2$ and on the other at the junction of the conductors 6 and 7. As will be seen from an inspection of the diagram in Fig. 2 of the drawings, the coils $C'$ and $C^2$ are wound in the same direction and connected, so that they form a continuous winding, connected at either end to the conductors 2 and 4, respectively. The coils $C^3$ and $C^4$ are each wound in the reverse direction to the coils $C'$ and $C^2$, and instead of being connected directly in series between the conductors 3 and 5 they are reversely connected, so that the circuit from the conductor 3 passes through the coil $C^4$, and thence through conductors 7 and 6 to coil $C^3$, and through it to the conductor 5. The direction of winding the coils and the connections shown are of course merely relative, it being quite immaterial what the direction of winding of the coils may be so long as the circuit connections are so made that the coils will produce the same effect as in the arrangement illustrated.

In order that the meter may correctly register the energy consumed in the circuit to which it is connected, it is essential that the potential and series currents on non-inductive load be displaced in phase by substantially ninety degrees. Figs. 1 and 2 of the drawings show one arrangement which may be used for securing this result. In this arrangement the potential current is obtained by induction from a highly-inductive primary $p$ of a transformer T, connected to the source of supply to which the meter is connected, so that the conductors which supply current to the potential and load circuits, respectively, are not connected directly to the same source, but instead are indirectly related through the windings of the transformer. The transformer is shown connected on the load side of the meter, and this connection is in general the most convenient one; but it may evidently be connected to the source at any desired point. As a means for producing the desired phase relation between the shunt and series currents I have indicated an inductive resistance I in the secondary circuit of the transformer; but any suitable phase-displacing means may be used in place of the particular one illustrated, it being essential only that the current in the potential circuit be displaced in phase by ninety degrees from the electromotive force impressed on the meter-circuit, or, what amounts to the same thing, from the current in the series circuit or noninductive load. The direction in which the turns of the meter-coils are wound and the connections between the same and the secondary of the transformer T are such that at any one instant opposite polarities are produced in the projections facing one another at the ends of the magnets M' and M², the relative directions of current-flow in the several sections of the winding being indicated by the light-line arrows adjacent to the turns. Thus the upper magnet may have at one instant a south pole at the left and a north pole at the right, while the lower magnet at the same instant will have a north pole at the left and a south pole at the right, assuming no interference by current in the series winding. This condition I have indicated by the light-line letters N and S in Fig. 2. Assuming that the magnets M' and M² are energized, as above indicated, the poles alternating from instant to instant, if a load is put upon the meter by closing the circuit to translating devices L, the flow of current in the series windings, as indicated by the heavy-line arrows in Fig. 2, will be in such a direction as to produce consequent poles of opposite sign at the middle projections $g$ and $h$ of the magnets. Thus the upper magnet may have at one instant a south pole at the projection $g$, while the lower magnet at the same instant will have a north pole at the projection $h$, the end projections of the upper magnet at this same instant being both north poles and the end projections of the lower magnet both south poles. This I have indicated by the heavy-line letters S and N in Fig 2.

Figure 3:
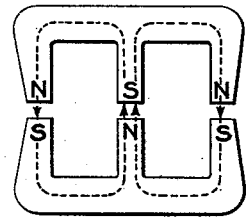
Figure 4:
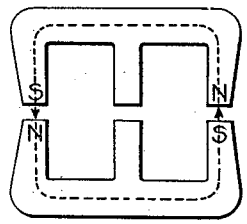
Figure 5:
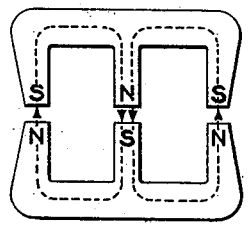
Figure 6:
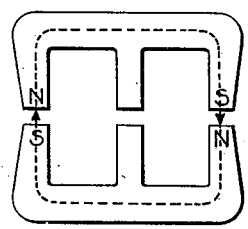

It will of course be understood that the shunt and series magnetizations indicated in Fig. 2 do not both have a maximum value at the same instant, but that one is at a maximum when the other has a zero value. Also it is to be noted that the windings are so arranged and connected that the series current will not induce any electromotive force in the potential circuit, the coils being so connected that the electromotive forces generated by induction due to the series current constitute a balanced system in so far as the potential circuit is concerned, and vice versa. The effect of the fluxes produced by the shunt and series currents is to cause a rotation of the meter-armature in a direction depending upon the direction of the currents relative to each other in the potential and series circuits. This effect may perhaps be best understood from an inspection of the diagrams in Figs. 3 to 6, inclusive. Fig. 3 is a diagram showing the arrangement of the poles in the field-magnet system at that instant in the cycle of alternation when the current in the series circuit is at a maximum and the current in the potential circuit zero. The diagram of Fig. 4 shows the arrangement of the poles ninety degrees later in the cycle when the series current has fallen to zero and the potential current has risen to its maximum value. The diagram of Fig. 5 shows the arrangement of the poles another ninety degrees later in the cycle, the current in the series circuit having now reached its maximum negative value and the potential current having again fallen to zero. Fig. 6 shows the arrangement of the poles at a point in the cycle ninety degrees later than that indicated in Fig. 5, when the potential current has reached its maximum negative value and the series current is again zero. From an inspection of these diagrams it will be noted that the field shifts from one polar projection to another as the current alternates in such a manner that the currents generated in the armature by the flux passing through one set of poles are a moment later attracted or repelled, as the case may be, by the fluxes between another set or sets of poles. For example, the current generated in the armature by the flux through the intermediate poles under the conditions illustrated in Fig. 3 is a moment later attracted by one set and repelled by the other of the poles shown in Fig. 4, the currents generated in the armature by the flux indicated in Fig. 4 being a little later attracted on one side and repelled on the other by the intermediate poles shown in Fig. 5. The attractions and repulsions are in such a direction as to produce a continuous rotation in the same direction, or, in other words, the fluxes may be said to change from moment to moment in such a manner as to produce a continuous shifting of the magnetic field in the same direction in a single field-magnet structure. Since the potential current is displaced by substantially ninety degrees behind the impressed electromotive force, the torque produced on the meter-shaft will, as is well understood, vary directly with the energy consumed by the load, and by the use of a suitable recording mechanism the meter may be caused to correctly register the energy consumed.

While I have shown the magnets M' and M² wound with a single winding, there is nothing to prevent the use of separate windings for the shunt and series circuits if such an arrangement is deemed desirable. In this case the meter-windings would still have a common magnetic circuit, although the shunt and series currents would flow in different paths.

I have not attempted in the present application to illustrate a complete meter structure having all its parts suitably supported from a common frame, since my invention relates only to the actuating field-magnet system and may be applied to any of the existing meter structures. The actuating field-magnet system I have illustrated in its preferred form; but I desire it to be understood that I am not limited to the specific form shown, and I aim to cover in the claims hereto appended all modifications which embody the essence of my invention.

What I claim as new, and desire to secure by Letters Patent of the United States, is—

1. In an alternating-current induction-meter, a field-magnet system provided with a single winding connected to both the series and the potential circuits.

2. In an alternating-current induction-meter, a field-magnet system provided with a single closed winding connected and arranged to serve at the same time as the series and the potential winding of the meter.

3. In an alternating-current meter, a field-magnet system provided with a single winding consisting of a plurality of coils connected to form a closed circuit and separate series and potential circuits connected to said winding.

4. In an alternating-current induction-meter, a field-magnet system provided with a single winding consisting of a plurality of coils connected to form a closed circuit, and connections from said single winding to a series and to a potential circuit, the said connections being so arranged that the electromotive forces induced in said winding, due to the series current, constitute a balanced system in so far as the potential circuit is concerned, and vice versa.

5. In an alternating-current induction-meter, a field-magnet system provided with a single winding adapted to serve both as a series and as a potential winding, conductors directly connecting said winding to an alternating-current source and to the load, and other conductors connecting the same winding to a source of potential inductively related to the said alternating-current source.

6. In an alternating-current induction-meter, a field-magnet system provided with a single winding adapted to serve both as a series and as a potential winding, and means for causing the current in the potential circuit to be displaced by substantially ninety degrees from the current in the series circuit, on non-inductive load.

7. In an alternating-current induction-meter, a field-magnet system provided with a single winding adapted to serve both as a series and as a potential winding, a load-current circuit, and a potential circuit connected to said single winding.

8. In an alternating-current induction-meter, a field-magnet system provided with a single winding adapted to serve both as a series and as a potential winding, a load-current circuit and a potential circuit connected to said single winding, the said circuits being connected to sources inductively related to one another.

9. In an alternating-current induction-meter, a field-magnet system provided with a single winding adapted to serve both as a series and as a potential winding, a load-current circuit and a potential circuit connected to said single winding, the said circuits being connected to sources indirectly related to one another.

10. In an alternating-current induction-meter, a field-magnet system comprising two similar magnet-cores, each having polar projections at its ends, and an intermediate polar projection between the end projections, a single winding comprising two coils on each of said magnet-cores and connections leading therefrom both to a potential and to a series circuit, the said coils being so connected and arranged that the potential current operates to magnetize the end projections only of the magnet-cores and the series current to produce magnetic poles at the intermediate projections.

11. In an alternating-current induction-meter, a field-magnet system comprising two similar magnet-cores, each having polar projections at its ends, and an intermediate polar projection between the end projections, a single winding comprising two coils on each of said magnet-cores, conductors uniting said coils in a closed circuit, a series circuit connected to the points between the two coils of each magnet-core, and a potential circuit connected to the points between two coils on different magnet-cores, the said coils being so connected and arranged that the potential current operates to magnetize the end projections only of the magnet-cores and the series current to produce magnetic poles at the intermediate projections.

12. In a field-magnet system for an alternating-current induction-meter, a core of magnetic material having polar projections at its ends and an intermediate polar projection between the end projections, coils thereon connected to potential and series circuits, the coils being so wound and the connections so arranged that the potential current will create opposite polarities in the end projections, and the series current a pole at the intermediate projection.

13. In an alternating-current induction-meter, two similar cores of magnetic material having polar projections at their ends, and another polar projection at a point intermediate thereof, the said cores being mounted so that the fluxes between their corresponding polar projections will intersect the meter-armature, and coils on said cores connected to potential and series circuits in such a manner that the potential current will generate a flux flowing in a path through the end projections of the two cores, and the series current a flux flowing in a path through the intermediate projections of the two cores.

14. In an alternating-current induction-meter, two similar cores of magnetic material having polar projections at their ends, and another polar projection at a point intermediate thereof, the said cores being mounted so that the fluxes between their corresponding polar projections will intersect the meter-armature, coils on said cores connected to potential and series circuits in such a manner that the potential current will generate a flux flowing in a path through the end projections of the two cores, and the series current a flux flowing in a path through the intermediate projections of the two cores, and a means for causing the shunt-flux to be displaced by ninety degrees from the flux due to the series winding on non-inductive load.

In witness whereof I have hereunto set my hand this 6th day of April, 1901.

ELIHU THOMSON.

Witnesses:
DUGALD McK. McKILLOP,
JOHN A. McMANUS.